3,442,672
DIMENSIONALLY STABILIZED CONCRETE AND MORTAR
Leo Kampf, 37–67 48th St., Sunnyside, N.Y. 11104
Filed Aug. 19, 1965, Ser. No. 480,950
Int. Cl. C04b 31/18, 7/32
U.S. Cl. 106—87                                2 Claims

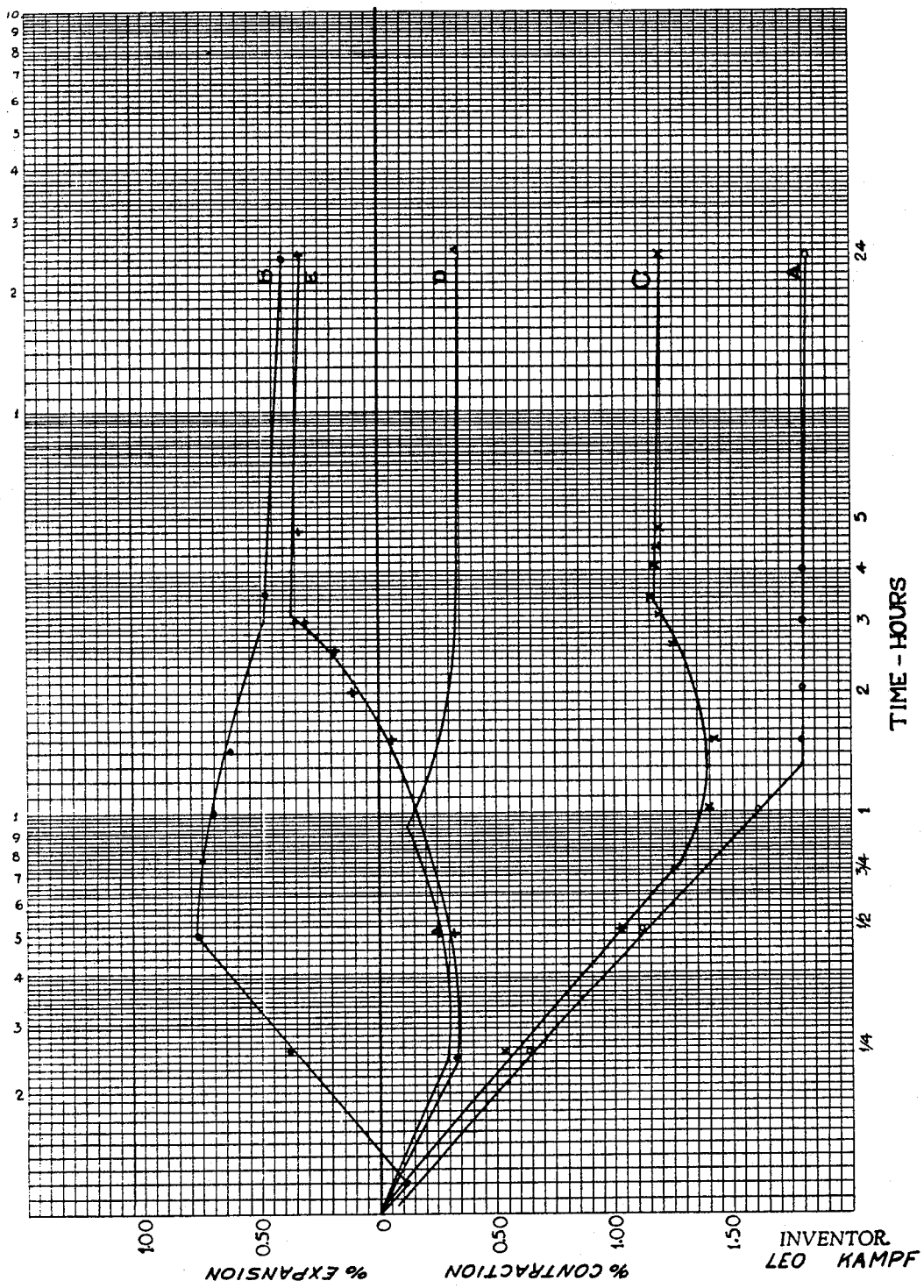

ABSTRACT OF THE DISCLOSURE

A method of making, and a material of, concrete having introduced therein aluminum flake powder in a concentration of 0.005 to 0.010 percent by weight.

Background of the invention

This invention relates to improved cement mortar and concrete. More particularly, it relates to a method for providing a concrete having improved dimensional and physical characteristics and also to a cement mortar.

In the ordinary application of concrete, deterioration occurs therein mainly because of the dimensional changes which concrete undergoes. Such dimensional changes are essentially caused by variations in ambient temperatures, wetting and drying, freezing and thawing, chemical reactions; and the transition of the concrete from the plastic to the set state. Shrinkage type of dimensional changes cause stresses in the concrete which results in cracks, lines of weakness, disintegration, etc. An expansion type of dimensional change after the concrete has hardened results in spalling. Of the causes for dimensional changes one of the most serious is the necessary transition from the plastic to the set state since the hardening period of a concrete and mortar material is the time of greatest shrinkage.

It has been known in the manufacture of lightweight concrete to introduce agents to cause it to expand during its transition from plastic to solid state. One agent which has been used has been aluminum, the aluminum reacting with the cement to cause the evolution of hydrogen which aerates the cement material causing it to expand in a manner analogous to the expansion of dough during the baking process when it is subjected to the action of yeast. Lightweight concrete produced through expansion thereof as a consequence of aeration, while serving the purpose of presenting a comparatively lightweight building material is characterized by great deficiencies in density, compression strength and other physical characteristics which are necessary under heavy duty and load conditions. Thus, whereas, lightweight concrete produced by the aeration process, as hereinabove described, may weigh as little as 50 to 110 pounds per cubic foot, for heavy duty purposes, it is desirable to provide a concrete which is substantially constant in volume, which beneficially expands only slightly during its transition period and whose weight is about 150 pounds per cubic foot.

In one production of the aforesaid lightweight concrete with aluminum, the aluminum has been used in a concentration of 0.22 to 0.27 percent by weight of the cement in the mix. This substantially high concentration of aluminum has resulted in the relatively great expansion of the concrete during its transition period with its concomitant great loss in weight and necessary physical strength and characteristics. Furthermore, another factor to be considered in the aluminum aeration process for making lightweight concrete is the need generally to use aluminum in powdered form to insure a comparatively rapid chemical reaction to quickly produce hydrogen gas for aeration to insure that gas is generated during the hardening period. Ootherwise, expansion is prevented. Where aluminum powder is used, however, if the particle size of the aluminum is too fine, there may result too rapid a gas evolving reaction which will go to completion prior to the completion of the concrete setting, i.e. normal shrinkage period. The choice of one type of aluminum powder that is used is also important as the rate of one reaction depends upon the surface area per unit weight of the aluminum powder. In this connection, it has been found that the use of flake, made by stamping aluminum is preferable to the use of atomized aluminum made by spraying molten aluminum since flake type aluminum powder has a much greater surface area than atomized aluminum powder and therefore reacts more rapidly than atomized powder.

The curves show the necessity of using the proper type and fineness of aluminum powder.

Curve A shows the shrinkage of a 1:4 mortar with no aluminum added. This curve shows that shrinkage is quite rapid up to about 1½ hours. At this time the mortar has stiffened sufficiently to retard any further change.

Curve B represents a 1:4 mortar to which 0.1% of a very reactive aluminum (Alcoa 408) has been added. This reacts so fast that the bulk of the reaction has occurred within ½ hour. The result is that the mortar first expands and then shrinks so the benefit of the expansion is lost.

Curve C represents a 1:4 mortar to which .015% of an aluminum powder that is not very reactive (Alcoa 423) has been added. The shrinkage is not compensated for within 24 hours.

Curve D represents a 1:4 mortar to which .0075% of a medium reactive aluminum (Alcoa 606) has been added. Again most of the reaction occurs before the mortar has set so that there is a subsequent shrinkage.

Curve E is a 1:4 mortar to which .0075% Alcoa 606 and .015% of Alcoa 423 have been added. This curve follows Curve D except that instead of falling off after one hour it continues to expand up to almost 3 hours, at which time the mortar has stiffened sufficiently so that no further shrinkage will occur.

It is clear that the problem presented by the need to mitigate deterioration of concrete due to dimensional changes caused by its transition during forming, chemical reactions and erosion, ambient tmperature changes and the like while maintaining substantially intact the concrete's physical strength, weight and desired properties, cannot be solved by the aluminum aeration method used for making expanded lightweight concrete since the latter method must per force result in a concrete material whose strength, physical properties and the like are degraded by such method.

For preventing full weight and full strength concrete from disadvantageously shrinking, it has been known to use finely divided metallic iron. The iron causes expansion of the concrete upon its being oxidized to iron oxide during the setting period. In this method, calcium chloride may be added to increase the rate of the iron oxidation reaction. However, the reaction, at its best, is quite slow and very little takes place prior to the hardening of the cement, the reaction taking as much as 28 days to go to completion. Thus the iron oxidation method presents a number of disadvantages, viz.: the time for the reaction to go to completion is too long; the reaction is variable in response to variations in moisture and temperature conditions; the reaction can cause stresses which may result in disintegration of the concrete since it takes place after the material has hardened; and the reaction requires an amount of iron large enought to result in an expensive process. Thus, iron enriched concrete to be made by the iron oxidation process is practicably utilized only where strength is absolutely necessary such as in the setting of machinery, columns, and the like and where shrinkage is critical such as in the patching of concrete floors, etc.

It is, accordingly, an important object of this invention to provide a method for producing a concrete and mortar material which undergoes a minimal dimensional change during its forming life and whose strength and other required physical characteristics are preserved.

It is another object to provide a concrete and mortar material characterized by minimal dimensional change during its forming life and whose strength and other required physical characteristics are preserved.

It is a further object to provide a method for making a concrete and mortar material in accordance with the preceding objects which is simple and inexpensive to thereby practicably permit its wide application and use.

In accordance with the invention, there is provided a method of making a concrete characterized by minimal dimensional change during its forming life and whose strength and other characteristics are preserved, comprising introducing into a concrete and mortar material, aluminum flake powder in a concentration of 0.005 percent to 0.010 percent by weight of the material, and forming the concret with the aluminized material.

Also in accordance with the invention, there is provided a material for making a concrete characterized by minimal dimensional change during its forming life and whose strength and other characteristics are preserved, comprising concrete and mortar material having incorporated therein, aluminum flake powder in a concentration of 0.005 percent to 0.010 percent by weight of the material.

For a better understanding of the invention together with other and further objects thereof, reference is made to the following description taken together with the accompanying drawing and its scope will be pointed out in the appended claims.

The drawing is a graph which illustrates the dependency of the percentage of contraction and the percentage of expansion on time (expressed in hours).

It has been found that when, in accordance with the invention, a cement mortar material has incorporated therein, 0.005 percent to 0.010 percent of aluminum by weight of the material and wherein the aluminum used is in a powder form which results from stamping flake powder, the concrete that is formed from such aluminized cement mortar material undergoes no shrinkage but a slight expansion during its forming period, i.e. from the time that the material is mixed until it is set. It has also been found that such expansion occurs sufficiently rapidly to take place before hardening occurs but not so rapidly that it goes to completion prior to the completion of the period in which shrinkage would normally take place in the absence of aluminum.

Such results ensue because the aluminum powder, being in flake form, presents a comparatively large surface to permit a satisfactorily rapid reaction, i.e., the evolution of hydrogen gas resulting from the reaction between the cement mortar material and the aluminum and yet is in a controlled concentration which does not permit an expansion great enough to degrade the strength and other required physical characteristics of the concrete. In this connection, it has been further found that where the aluminum powder is in a form which results from the stamping of the flake powder and is in a concentration of 0.005 percent to 0.010 percent by weight of the cement mortar material, the strength characteristics of the concrete such as its compression strength is enhanced.

It is to be realized that, in accordance with the invention, by the expansion imparted by the hydrogen resulting from the reaction of the aluminum with the cement mortar material, because of the chance of type and concentration of aluminum powder used, the normal shrinkage which would occur in the absence of such aluminum powder is substantially compensated for by the evolution of gas when aluminum powder is present at the time when the bulk of such shrinkage would normally occur. By contrast, in the known method of making lightweight concrete by using much higher concentrations (approximately 30 times) of aluminum powder, the time of the hydrogen evolving chemical reaction produced by the presence of aluminum is not important, it merely being necessary that such reaction occur before the lightweight concrete has completely hardened.

In the following tables, there are shown typical examples of concrete made in accordance with the principles of the invention as compared with those not so made. The examples of Table 1 result from the use of mixes of 1 to 3 mortars by volume; the examples of Table 2 result from the use of mixes of 1 to 4 mortars by volume and the examples of Table 3 result from one use of concrete with 5.5 bags of cement per cubic yard. In the tables, the "Number" column denotes the designation applied to the type of aluminum by the Aluminum Company of America. A minus (—) indicates contraction.

TABLE 1

| Percent by Weight of Aluminum | Number | Type | Fineness, Percent P 325 | Percent Expansion, Time After Mixing | | | Compression Strength (p.s.i.) | |
|---|---|---|---|---|---|---|---|---|
| | | | | ¼ hr. | 1 hr. | 24 hrs. | 7 days | 28 days |
| 1 | None | | | | | −1.17 | 5,151 | 6,826 |
| 2 | 0.010 | 120 | Atomized | 40 | 0.00 | 0.00 | −0.08 | 6,162 | 7,676 |
| 3 | 0.010 | 123 | do | 93 | 0.00 | 0.00 | −0.09 | 6,725 | 7,288 |
| 4 | 0.010 | 408 | Flake | 99 | 1.32 | 2.36 | | 4,800 | 6,419 |
| 5 | 0.005 | 408 | do | 99 | 0.38 | 0.40 | 0.30 | 5,200 | 7,613 |
| 6 | 0.005 | 422 | do | 100 | 0.32 | 0.17 | 0.05 | 5,125 | 7,625 |
| 7 | 0.005 | 606 | do | 90 | 0.07 | 0.21 | 0.16 | 5,300 | 7,963 |

In the foregoing table, it is noted that in Example 1 whereas no aluminum is utilized, a shrinkage takes place and that in Examples 2 and 3 where atomized aluminum is utilized, no expansion occurs. In Examples 2 and 3 there is even a slight shrinkage. In all of the examples, 4 to 7 wherein there are utilized flake powder aluminum in concentrations in accordance with the invention, expansion takes place relatively rapidly and stabilizes after a period of 28 days, the compression strengths in the concretes resulting from the inventive method have become appreciably enhanced. It is noted that in Example 6 there is a rapid expansion and then a rather abrupt contraction. This is because the number 422 aluminum powder used therein is of extra fine particle size. This could leave a void if machinery is set on such mortar or concrete.

TABLE 2

| Percent by Weight of Aluminum | Number | Type | Fineness, Percent P 325 | Percent Expansion, Time After Mixing | | | Compression Strength (p.s.i.) | |
|---|---|---|---|---|---|---|---|---|
| | | | | ¼ hr. | 1 hr. | 24 hrs. | 7 days | 28 days |
| 1.......... None | | | | −0.28 | −1.26 | −1.50 | 4,684 | 5,753 |
| 2.......... 0.005 | 606 | Flake..... | 90 | −0.03 | −0.06 | −0.22 | 4,858 | 6,279 |
| 3.......... 0.0075 | 606 | ...do...... | 90 | −0.03 | 0.14 | 0.11 | 4,658 | 6,169 |
| 4.......... 0.010 | 606 | ...do...... | 90 | −0.04 | 0.38 | 0.51 | 4,625 | 5,811 |
| 5.......... 0.22 | 606 | ...do...... | 90 | | | 25.60 | 1,098 | 1,570 |

Here again, as in the examples of Table 1, there are shown the beneficial controlled expansion and enhanced compression strength characteristics of concretes made in accordance with the principles of the invention. Example No. 5 shows the large reduction in strength that results when the minimum quantity of aluminum recommended for lightweight concrete is used.

TABLE 3

| Percent by Weight of Aluminum | Number | Type | Fineness, Percent P 325 | Percent Expansion, Time After Mixing | | | Compression Strength (p.s.i.) | |
|---|---|---|---|---|---|---|---|---|
| | | | | ¼ hr. | 1 hr. | 24 hrs. | 7 days | 28 days |
| 1.......... None | | | | | | −0.18 | 3,425 | 3,970 |
| 2.......... 0.005 | 606 | Flake..... | 90 | | | 0.42 | 3,480 | 3,973 |
| 3.......... 0.0075 | 606 | ...do...... | 90 | | | 0.80 | 3,025 | 3,456 |
| 4.......... 0.010 | 606 | ...do...... | 90 | | | 1.53 | 2,895 | 3,680 |
| 5.......... None | | | | | | −0.48 | 3,580 | 4,760 |
| 6.......... 0.0075 | 606 | Flake..... | 90 | | | 0.85 | 3,610 | 4,630 |

Mixes 1–4 contained a type 1 cement; mixes 5 and 6 contained a type 2 cement.

While the examples in Table 3 do not indicate expansion results after ¼ hour and 1 hour periods respectively, it is clear that Examples 2, 3, 4 and 6 therein made in accordance with the invention do show advantageous expansion characteristics in the 24 hour period.

Table 4 indicates a comparison as to the 24 hour expansion characteristics and weight between examples where no aluminum flake powder additive is used, where examples made in accordance with the invention are used, and where the quantity of aluminum recommended for the production of lightweight concrete is used.

TABLE 4

| Material | Aluminum Additive | Expansion 24 hours, percent | Weight 1 Cubic Foot, lbs. |
|---|---|---|---|
| 1. Same as in Table 3........ | None........ | −0.48 | 151.1 |
| | 0.0075% Al.... | 0.85 | 151.3 |
| 2. Same as in Table 2........ | None........ | −0.17 | 134.6 |
| | 0.0075% Al.... | 0.14 | 135.4 |
| | 0.22% Al...... | 25.00 | 89.2 |

Table 4 shows the advantageous results as to expansion and weight increase flowing from the use of concrete made in accordance with the invention.

While there have been described what are considered to be the preferred embodiments of the invention, it will be obvious to those skilled in the art that various changes and modifications may be made therein without departing from the invention and it is, therefore, aimed to cover all such changes as fall within the true spirit and scope of the invention.

What is claimed as new and desired to be secured by Letters Patent of the United States is:

1. A method of making concrete characterized by minimal dimensional change during its forming life and whose strength and other characteristics are preserved consisting essentially of introducing into a concrete mixture, aluminum flake powder in a concentration of about 0.005 percent by weight of said material, and forming said concrete.

2. A material for making a concrete characterized by minimal dimensional change during its forming life and whose strength and other characteristics are preserved consisting essentially of a cement mixture having incorporated therein, aluminum flake powder in a concentration of 0.005 percent by weight of said material.

References Cited

UNITED STATES PATENTS 2,023,001  12/1935  Billner ............... 106—97
2,153,837  4/1939  Hybinette ............ 106—87
3,021,291  2/1962  Thiessen ............. 106—97

JAMES E. POER, Primary Examiner.

U.S. Cl. X.R.

106—97, 314